US008811571B2

(12) United States Patent
Croot et al.

(10) Patent No.: US 8,811,571 B2
(45) Date of Patent: Aug. 19, 2014

(54) DATA COLLECTION IN AN ACCESS NETWORK

(75) Inventors: Christopher M. Croot, London (GB); Ashley Pickering, London (GB); Philip A. Everett, London (GB); Trevor Linney, London (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 13/637,590

(22) PCT Filed: Mar. 25, 2011

(86) PCT No.: PCT/GB2011/000434
§ 371 (c)(1),
(2), (4) Date: Sep. 26, 2012

(87) PCT Pub. No.: WO2011/117590
PCT Pub. Date: Sep. 29, 2011

(65) Prior Publication Data
US 2013/0028392 A1 Jan. 31, 2013

(30) Foreign Application Priority Data

Mar. 26, 2010 (EP) ..................................... 10250612

(51) Int. Cl.
*H04M 1/24* (2006.01)
*H04M 3/08* (2006.01)
*H04M 3/22* (2006.01)

(52) U.S. Cl.
USPC ..................................... 379/29.09; 379/15.03

(58) Field of Classification Search
USPC .......... 379/15.03, 29.09, 133, 1.03, 27.07, 28
See application file for complete search history.

(56) References Cited

U.S. PATENT DOCUMENTS

| 2006/0059262 A1* | 3/2006 | Adkinson et al. ............. 709/225 |
| 2006/0159026 A1* | 7/2006 | Wu et al. ....................... 370/252 |
| 2006/0239428 A1* | 10/2006 | Taylor .......................... 379/126 |
| 2011/0010444 A1 | 1/2011 | Everett et al. |
| 2011/0191472 A1 | 8/2011 | Croot et al. |

FOREIGN PATENT DOCUMENTS

| EP | 2 107 779 | 10/2009 |
| EP | 2 169 980 | 3/2010 |
| WO | WO 2006/076518 | 7/2006 |

OTHER PUBLICATIONS

International Search Report for PCT/GB2011/000434 mailed Jun. 7, 2011.
Extended European Search Report (8 pgs.) dated Aug. 30, 2010 issued in corresponding European Application No. 10250612.8.
U.S. Appl. No. 13/121,905, filed Mar. 30, 2011.

* cited by examiner

*Primary Examiner* — Quoc D Tran
(74) *Attorney, Agent, or Firm* — Nixon & Vanderhye P.C.

(57) ABSTRACT

A telecommunications access network includes a plurality of telecommunications lines (1), a plurality of aggregation devices (51-54), a plurality of data collector modules (71-73) and a line provisioning and de-provisioning system (90), wherein each line is connected between customer premises equipment (11-13,21-23,31-33,41-43) and a line aggregation device (51-54). The access network is operable to provide data connections through at least a first sub-set of the lines (1) to a core network whereby network services may be provided over the network to the customer premises equipment. The access network further includes a management module (80) for managing at least a second sub-set of the lines (1) within the access network, the management module (80) being operable to receive aggregated data from a plurality of data collector modules, each data collector module (71-73) being operable to receive data from a plurality of the line aggregation devices. The network further comprises a file check module having a line status database (106) for storing information about the lines which are managed by the management module including the identity of the line aggregation device to which each line is connected and means for receiving information from the line provisioning and de-provisioning system and means for using the information received from the line-provisioning and de-provisioning system to maintain the file check module's database current. The file check module further comprises means (104) for receiving received data information from the management module specifying what data it has received and means (102,200) for comparing the received data information with data from the database (106) to generate comparison data, and output means (102,200) for outputting the generated comparison data.

12 Claims, 3 Drawing Sheets

DATA COLLECTION IN AN ACCESS NETWORK

This application is the U.S. national phase of International Application No. PCT/GB2011/000434 filed 25 Mar. 2011 which designated the U.S. and claims priority to EP 10250612.8 filed 26 Mar. 2010, the entire contents of each of which are hereby incorporated by reference.

FIELD OF THE INVENTION

The present invention relates to a method of and apparatus for performing data collection in an access network, and in particular, for collecting performance (and operational) data associated with individual lines within a fixed-line telecommunications access network in order to perform Dynamic Line Management (DLM) of those lines.

BACKGROUND TO THE INVENTION

Modern access networks enable broadband connections to be established over the network to permit end users, or subscribers, to achieve fast access to the services provided over the Internet. A popular technology for providing such broadband connections is Digital Subscriber Line (DSL) technology. This permits high data rates to be transmitted over legacy copper connections which are already present in the network (from legacy Plain Old Telephone Services (POTS). More recently, operators have started to provide rate-adaptive services using DSL techniques. In a rate-adaptive DSL mode, the aim is that lines should operate at the maximum rate at which they are capable of operating.

The basic approach for operating in a rate-adaptive mode relies on the fact that in DSL systems, when the DSL connection is being established (or re-established after some break in the connection) a synchronisation process occurs during which the DSL modems on either side of the connection (also referred to as DSL transceiver units, there being a remote end unit and a Central Office end unit—in ADSL systems these may be referred to as an ADSL Transceiver Unit—Remote end (ATU-R) and an ADSL Transceiver Unit—Central office end (ATU-C)) determine a theoretical maximum line rate at which the line could be established based on the levels of noise and signal attenuation, etc. experienced on the line during the synchronisation period and also dependent upon the "profile" upon which the line is operating. The profile sets parameters such as the Signal-to-Noise ratio Margin (SNM) at which the line should operate and the amount of interleaving to be used on the line etc., which parameters affect the stability of the line. The basic approach for performing rate adaptive DSL is then just to set the line to operate at the theoretical maximum line rate determined during the synchronisation process. This can be enhanced somewhat in order to account for the fact that conditions may change somewhat after synchronisation, usually by setting the actual line rate to somewhat less than the maximum achievable rate reported by the DSL modems during synchronisation (to accommodate the possibility that conditions change for the worse after synchronisation).

However, it is far from straightforward to determine whether or not such an additional margin for error should be built into the system for each individual line on a case by case basis, nor of determining the best way to do this (e.g. one easy way to achieve this is to place a line on a profile which is more stable than might seem to be necessary, etc.). Clearly if too much margin for error (e.g. to accommodate a line's noise environment becoming worse over time after synchronisation) is used on a particular line, then that line will be operating at less than its maximum achievable rate for no good reason. Similarly other lines might have a noise environment which changes much more significantly over time and as such the margin for error could be too small and then the line could still suffer from loss of connections, etc.

In order to try to find an optimum way of operating lines such that they achieve an optimum balance between stability and line rate (and latency, jitter, etc.) various techniques may be employed referred to generally as Dynamic Line Management (DLM). All of these techniques have in common that they need to have data about the operation/performance of the lines being managed. Generally speaking, the more data which the system has, the better it is able to find an optimum level of operation for each line to achieve a particular desired level of balance between stability and performance (e.g. speed/bandwidth, latency, jitter, etc.) This data is then processed by a DLM system which attempts to set/modify the operating parameters of each line to maintain each line operating with good stability at the maximum rate which the line can reliably sustain.

In order to collect this data, it is known to use devices known as data collectors or element managers. Each of these is responsible for a certain number of Digital Subscriber Line Access Multiplexors (DSLAMs) and/or Multiple Service Access Nodes (MSANs) or equivalent item (usually located within a local exchange or central office as they are known in the United States). These known devices then aggregate the data and forward it on to a central DLM system—typically a given access network will have just one centralised DLM system. In large access networks there may be several tens of element managers/data collectors each responsible for a hundred or so DSLAMs/MSANs with each of these having several hundreds of broadband connections being aggregated there. These two levels of aggregation can manage in total several million broadband connections. This in turn can give rise to a very large amount of data being collected, especially if a large proportion of the total amount of potentially useful performance/operational information about each line which is readily available to a DSLAM/MSAN is collected by the system for processing by the DLM system.

It is important to identify if the collected data on which decisions are being made are correct. The present inventors have determined that the most common way in which data is corrupted is by data going missing. The present inventors have further realised that in prior art systems in which the DLM system includes a central point which collects lots of information about individual lines and then makes decisions based on the collected data, it is difficult for the DLM system to ascertain if it has actually received all of the data which it is supposed to have received.

WO 2006/076518 describes a system of the type generally discussed above in which a central DLM management function collects operational data from a number of different elements within a DSL access network system and makes decisions about the correct profile to apply to each individual DSL connection based on that collected current data together with historical data from a historical data database. The key aspect of this system is that unlike most conventional DLM systems, instead of just relying on physical and/or data link layer metrics, this system additional looks at network and higher layer metrics when making decisions about appropriate profiles to choose for DSL connections. However, there is no discussion of the possibility that information received by the central DLM management function might be incorrect, let alone any suggestions for how to detect that such received information is incorrect (e.g. because some of the data that should have been collected is missing). Therefore, it fails to disclose a file check module comprising a receiver for receiving received data information from a management module (e.g. the DSL control system 102 or the decision model 130 thereof) specifying what data the management module has received and a comparator for comparing the received data information with data from a line status database (storing status data about individual lines—e.g. indicating which lines are set up to carry DSL connections and which are not) to generate comparison data (e.g. identifying missing data), and an output for outputting the generated comparison data.

EP 2 107 779 is an earlier patent application of the present Applicant which also deals with a centralised DLM system along the lines generally described above. Again there is no discussion or realisation of the problem which is tackled by the present invention. Thus, there is no discussion of the possibility that information received by the central DLM management function might be incorrect, let alone any suggestions for how to detect that such received information is incorrect (e.g. because some of the data that should have been collected is missing). Therefore, it fails to disclose a file check module comprising a receiver for receiving received data information from a management module (e.g. the management device 100) specifying what data the management module has received and a comparator for comparing the received data information with data from a line status database to generate comparison data (e.g. identifying missing data), and an output for outputting the generated comparison data.

SUMMARY OF THE INVENTION

According to a first aspect of the present invention, there is provided a telecommunications access network including a plurality of telecommunications lines, a plurality of aggregation devices, a plurality of data collector modules and a line provisioning and de-provisioning system, wherein each line is connected between customer premises equipment and a line aggregation device, the access network being operable to provide data connections through at least a first sub-set of the lines (since some other ones of the lines not within the first sub-set of lines might be pure voice only lines which are not set up to provide data connections) to a core network whereby network services may be provided over the network to the customer premises equipment, the access network further including a management module for managing at least a second sub-set of the lines within the access network (since of those lines which are within the first subset in that they a arranged to provide data connections, some of them, which are not within the second subset of lines, might be managed by a different network operator) the management module being operable to receive aggregated data from a plurality of data collector modules, each data collector module being operable to receive data from a plurality of the line aggregation devices, the network further comprising a file check module, the file check module having a line status database for storing information about the lines within the second sub-set of lines being managed by the management module, the stored information including the identity of the line aggregation device to which each managed line is connected and means for receiving information from the line provisioning and de-provisioning system and means for using the information received from the line provisioning and de-provisioning system to maintain the file check module's database up-to-date (especially in terms of which lines are provisioned for providing data connections and which are provisioned for providing voice only services etc.); the file check module further comprising means for receiving received data information from the management module specifying what data the management module has received and means for comparing the received data information with data from the line status database to generate comparison data, and output means for outputting the generated comparison data.

In this way, the network is able to identify missing data. Clearly, if a line is being managed by the management module (i.e. it belongs in the second subset of lines) and it is provisioned for providing a data connection (i.e. it is in the first sub-set of lines), then there should be information about the recent performance of that line. The line status database stores information which specifies whether or not there ought to be DSL performance data for a particular line or not (e.g. if it belongs in both the first and second subsets of lines then there should be performance data about the line). Naturally, from this information it is additionally possible to determine if any performance data can be expected form a particular data collector module or not (since so long as performance data is expected for at least one line for which a particular data collector is responsible, then clearly performance data should be expected from that particular data collector). Of course it may be that a particular line is provisioned for providing a DSL connection but that no connection is actually set up for a period of time—this situation is normally positively identifiable from the received performance data if it is correctly received. The term missing data refers to data (e.g. performance data about a particular line in the first and second subsets) which has not been received by the management module from one of the data collectors, even though the database suggests that such data (e.g. about a particular line) should have been received (i.e. because the line in question is in the first and second sub-sets of lines).

Preferably, the output means may include means for initiating a re-request for the missing data to be sent to the management module. Preferably, the output means includes a web-interface for permitting users and/or automated services to determine the results of the comparison from a remote location. Furthermore, the output means may simply comprise means for storing the data in a database (e.g. within the file check module, preferably as part of the line status database) for subsequent viewing by, for example, an engineer.

The line-provisioning and de-provisioning system is preferably a part of the Operational Support System (OSS) for the access network which has knowledge of lines being provisioned and de-provisioned so as to be able to ascertain what kind of connection is being formed over the line (e.g. whether a DSL connection or not and if so whether a fixed or rate adaptive connection).

Note that the access network may have differences in the way certain lines are connected to aggregation devices depending upon the particular type of architecture being used for the line in question. For example in one Fibre To The Cabinet (FTTC) architecture, mini DSLAMs may be located in the cabinets and these will provide a first aggregation point, however, in such an architecture, typically, there will be a further aggregation point at the exchange in the form of a Multi Services Access Node (MSAN) incorporating an Optical Line Termination (OLT), aggregating a number of fibre connections (to other cabinets and/or to premises directly); in such a case, the data collected by data collectors may be collected from the MSAN rather than directly from the mini-DSLAMs. In such a case, the MSAN is acting as a line aggregation device from which data about individual lines is collected, even though the lines in question are only indirectly connected to the MSAN, being directly connected to the mini-DSLAM rather than directly to the MSAN. None-theless, the principle remains much the same even though the (copper) lines (operating in a DSL mode—most likely a VDSL mode) are not directly connected to the aggregation point (the MSAN/OLT) but are only indirectly connected to it.

Note that the first and second subsets of lines may be the same sub-set. Moreover, the sub-sets could represent the entirety of the lines within the access network, although this is unlikely at present since generally there is always a large number of lines which are not set up to carry data and instead carry only conventional telephone signals (for voice connections). Generally speaking, the sort of line management to which the present invention relates concerns lines carrying data at relatively high data rates using a technique such as xDSL (i.e. ADSL, VDSL or some other DSL variant), whereas conventional telephone lines which are simply providing Plain Old Telephone Services (POTS) do not have different profiles on which they may be operated (and do not generate much performance/operational data) and hence there is little benefit (or possibility) of performing complex line management on such lines, and therefore such lines will not generally tend to be managed by a centralised line management system; furthermore, the sort of issues requiring active dynamic line management such as dropping connections resulting from changes in the noise environment occurring up to several hours or days after the line was originally synchronised, etc. are often mostly associated with DSL connections operating in a rate adaptive mode, as opposed to DSL connections operating at a fixed rate, and so some systems may actively control only DSL connections operating in a rate adaptive mode, even though they may gather data in respect of all DSL lines (but not POTS lines) including rate adaptive and fixed rate DSL connections, thus resulting in the second sub-set itself being a proper sub-set of the first subset of lines. Note that because lines are constantly being provisioned and de-provisioned for various services over time the sub-sets are very likely to change on a regular basis (e.g. daily).

Preferably, the line status database further stores comparison data (as generated by the file check module) and most preferably, it stores historical comparison data going back in history up to a predetermined point (e.g. historical data for the past 3 months, or the past year, etc.). Historical data older than a predetermined period may be stored in a summarised form in order to save space in the database. (As a basically equivalent alternative, an additional database could be provided for storing the comparison data instead of using the line status database; however, it is preferred to use the line status database as it is then easier to perform integrated queries etc.)

According to a second aspect of the present invention, there is provided a method of gathering operation/performance data about telecommunications lines within a telecommunications access network, the telecommunications access network including a plurality of telecommunications lines, a plurality of aggregation devices, a plurality of data collector modules and a line provisioning and de-provisioning system, wherein each line is connected between customer premises equipment and a line aggregation device, the access network being operable to provide data connections through at least a first sub-set of the lines to a core network whereby network services may be provided over the network to the customer premises equipment, the access network further including a management module for managing at least a second sub-set of the lines within the access network, and a file check module, the method comprising: a plurality of the data collector modules transmitting aggregated performance/operation data to the management module, each data collector module being operable to receive line performance/operation data from a plurality of the line aggregation devices; and the method further comprising the file check module maintaining a database storing information about the lines which are managed by the management module and receiving information from the line provisioning and de-provisioning system and using the information received from the line-provisioning and de-provisioning system to maintain the database current; the file check module further receiving received data information from the management module specifying what data the management module has received, comparing the received data information with data from the database to identify missing data, and outputting the results of the comparison.

Preferably, the step of outputting the results of the comparison may include initiating a re-request for the missing data to be sent (or re-sent) (by an appropriate device/collector) to the management module. Preferably, the file check module includes a web-interface for permitting users and/or automated services to determine the results of the comparison from a remote location.

Preferably, the line status database maintained by the file check module includes information specifying which aggregator devices are managed by which data collector modules (if a data collector collects data from a particular aggregator device it can be considered as managing that device) and the method further includes, each time the management module receives a file of data from a data collector, the management module determining the identities of aggregator devices whose data is contained within the received file and sending these identities together with the identity of the respective data collector to the file check module, whereupon the file check module checks to see that all of the expected aggregator devices have been included in the file received by the management module.

The present invention is particularly advantageous in situations where aggregator devices (e.g. DSLAMs or MSANs) neither keep nor send any operation/performance data during times when a line is disconnected. In such circumstances, it can be difficult to ascertain if "missing" data has been "lost" (i.e. if there was or should have been data generated and reported but something has gone wrong in the generation/reporting process and the data has thus gone awry) or whether it is simply "null data" (e.g. if the connection was simply down for the period in question such there was no operation/performance data to report for the period in question). By maintaining a record at the file check module of all "missing" data it may be possible to make educated guesses as to which event has occurred based on the records of the missing data; for example, if the data for a number of lines all connected to the same aggregation device have all gone missing in respect of the same period of time, it is quite likely that the data has been lost, on the other hand if there is missing data for a particular line corresponding approximately to non-working hours (e.g. 6 pm til 8 am Mon-Fri and from 6 pm on Friday until 8 am on Monday) it is quite likely that the customer is turning off his/her modem out of work hours, etc. It is useful to be able to distinguish between these two different cases in order to enable the management module to take appropriate action. For example, if a line is only connected for a short period of time and still experiences disconnections and or errors etc. it is likely to be appropriate for the management module to move the connection on to a less aggressive profile, on the other hand, if there is a large amount of lost data, it may be inappropriate to move a particular connection to a less aggressive profile simply because a reconnection or some errors have occurred within the small portion of the total data which has not been lost (since the lost data could correspond to a large amount of error-free operation).

The operation/performance data which is reported about each circuit preferably includes at least the number of resynchs occurring on a line within a "bin period". Preferably each bin period covers at most 24 hours, and most preferably it covers a 15 minute period. Preferably the operation/performance data additionally includes information per bin about the number of severely errored secons occuring on the line and the number of errors corrected using Forward Error Correction (FEC). Most preferably, the data includes information about the number of bits allocated to each channel during the bin period (i.e. the "bit loading").

The present invention also relates to a file check module for use in the access network of the first aspect of the present invention per se, and to carrier means, especially tangible and/or non-transient carrier means such as a magnetic or optical disk or a solid state storage device such as a hard drive or a usb thumb drive, etc., carrying a computer program or programs for causing the methods of the second aspect of the invention to be carried out when executing the program or programs stored on the carrier means.

In an embodiment, there is provided a telecommunications access network including a plurality of telecommunications lines, a plurality of aggregation devices, a plurality of data collector modules and a line provisioning and de-provisioning system, wherein each line is connected between customer premises equipment and a line aggregation device, the access network being operable to provide data connections through the lines to a core network whereby network services may be provided from the core network over the access network to the customer premises equipment, the access network further including a management module for managing the lines, the management module including a receiver for receiving aggregated data from a plurality of data collector modules, each data collector module including a receiver for receiving data from a plurality of the line aggregation devices, the network further comprising a file check module, the file check module having a line status database for storing information about the lines including the identity of the line aggregation device to which each line is connected and a receiver for receiving information from the line provisioning and de-provisioning system and a processor for processing the information received from the line-provisioning and de-provisioning system to maintain the file check module's database up-to-date; the file check module further comprising a receiver for receiving received data information from the management module specifying what data the management module has received and a comparator for comparing the received data information with data from the line status database to generate comparison data, and an output for outputting the generated comparison data.

In an embodiment, the output comparison data identifies missing line performance data and the access network further comprises a device for requesting that the identified missing line performance data should be re-sent from either a respective line aggregation device and/or a respective data collector module identified as a possible source for the identified missing line performance data.

BRIEF DESCRIPTION OF THE DRAWINGS

In order that the present invention may be better understood, embodiments thereof will now be described, by way of example only, with reference to the accompanying drawings in which.

DETAILED DESCRIPTION OF A FIRST EMBODIMENT

Figure 1:
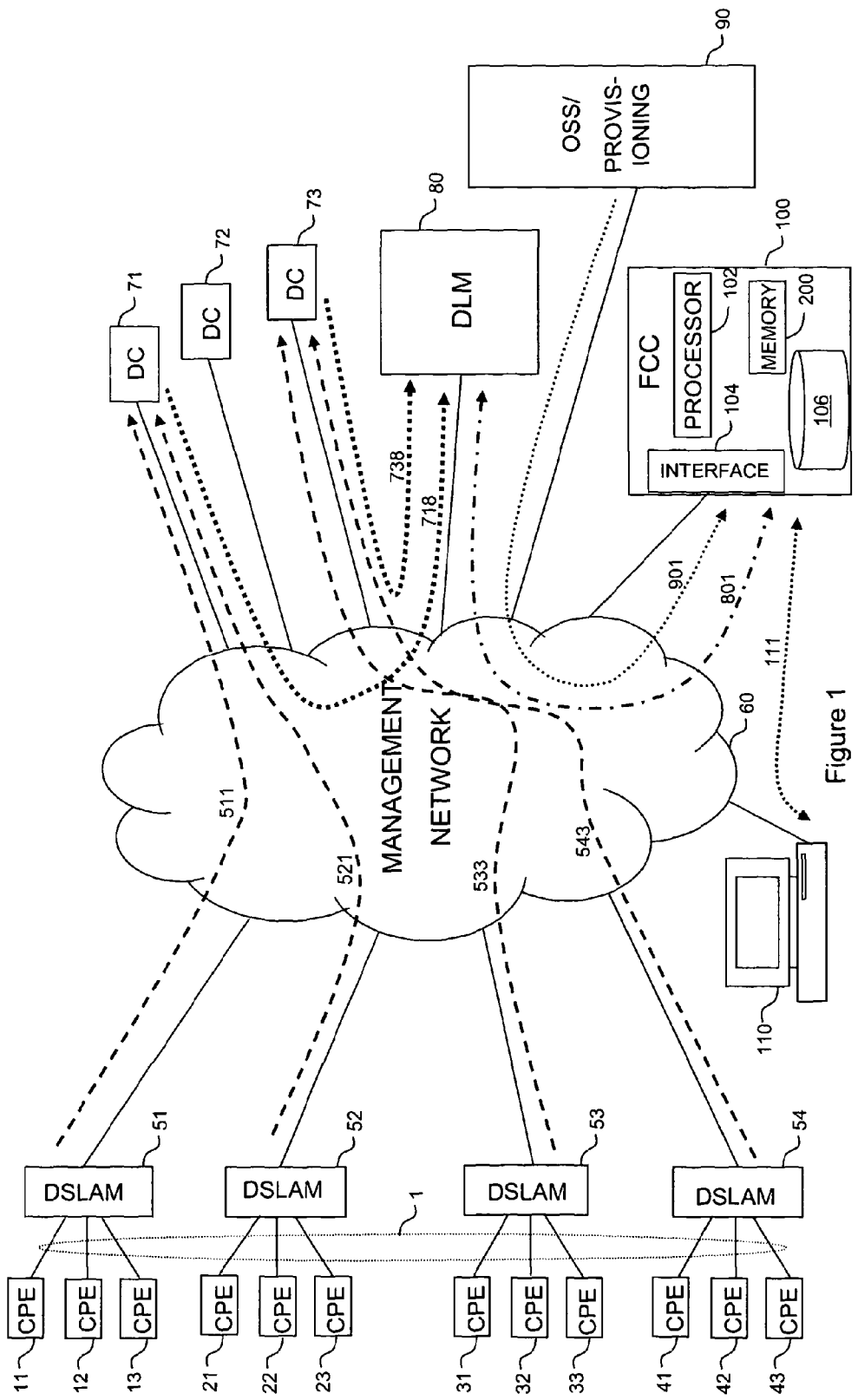
FIG. 1 is a schematic overview of a telecommunications access network according to an embodiment of the present invention.

FIG. 1 illustrates a telecommunications access network according to a first preferred embodiment of the present invention. For the most part, the network is arranged in a known manner—see for example the present Applicant's earlier patent applications published with publication Numbers WO 2007/012867 & WO 2009/122137 the contents of which are incorporated herein by reference. A number of sets of Customer Premises Equipment (CPE) 11-13, 21-23, 31-33 are connected, via copper pair lines 1 (these correspond to the telecommunications lines as claimed) over which Asynchronous Digital Subscriber Line (ADSL) connections are established, to Digital Subscriber Line Access Multiplexors (DSLAMs) 51-54 (which constitute the aggregation devices as claimed in the present embodiment). Naturally, the DSLAMs have onward connections through the remainder of the access network towards the core network to permit data to be transmitted to and received from the core network, etc. However these connections are not shown in FIG. 1 since they are not relevant to the present embodiment which instead is concerned with the management of the DSLAMs 51-54 and the associated DSL connections 1.

Thus, each of the DSLAMs is connected to a Management Network 60 via which it can communicate with a corresponding Data Collector (DC) (also known as an Element Manager) 71, 72, 73 (these constitute the data collector modules as claimed in the present embodiment). These lines of communication are illustrated in FIG. 1 by dashed lines 511, 521, 533, 543 illustrating lines of communication between DSLAMs 51 and 52 and DC 71 and between DSLAMs 53 and 54 and DC 73 respectively. The DCs periodically or from time to time collect (or are sent) performance/operational data from the DSLAMs about the respective DSLAM's respective DSL connections. The nature of this information (and the amount) is changing (and increasing) over time as access network technology develops. In modern networks a large amount of such data is generated by the DSLAMs (and Multi Service Access Nodes (MSANs) in access networks using these) and then collected by the DCs and used in order to improve the level of service offered to subscribers of the network. Examples of the type of information which may be produced by DSLAMs which may be used in the present embodiment are described in more detail below.

The data collected by the DCs may be aggregated by the DC's (the extent to which any such aggregation is done is dependent upon the particular manufacturer and/or model of the device in question). The data is then periodically or from time to time transferred from each DC to the Dynamic Line Management module (DLM) 80 (this constitutes the Management module as claimed in the present embodiment), also via the management network 60; dotted lines 718 and 738 in FIG. 1 illustrate lines of communication between DC 71 and DC 73 to the DLM 80 respectively over which the aggregated data from the DCs is transmitted to the DLM 80. DLM 80 is basically software which runs on a large server computer. (For more details about the general operation of a DLM, or a management module in general, the reader is referred to the Applicant's earlier patent applications as mentioned above or, for example, WO 2009/010726.) The DLM of the present embodiment is modified from such a known management module in that it is additionally operable to interact with the File Check Console (FCC) 100 as indicated by the bidirectional dotted and dashed line 801.

The structure and operation of the FCC 100 is described in greater detail below. In overview, however, the FCC is operable to receive details from the DLM 80 abut what data it has received, to check this data against a database 106 (which it maintains locally in the present embodiment) and to identify any apparently missing data such that appropriate action can be taken to account for any such missing data. Such actions may include asking the device where the data appears to be missing form to resend the missing data, informing an engineer about the missing data to investigate what problem might be causing the data to go missing and modifying the operation of the management module 80 in order to account for the fact that the data is missing (e.g. to prevent moving a particular line to a less aggressive profile than necessary based on only a small amount of performance/operational data).

In order to keep its database up-to-date, especially in order to be able to add newly provisioned connections to its database 106 and to be able to remove de-provisioned lines from its database 106, the FCC 100 has an additional line of communication with a line provisioning and de-provisioning system 90 which forms a part of the Operational Support Systems (OSS) system of the access network illustrated in FIG. 1. This line of communication is illustrated in FIG. 1 by the dotted line 901. The FCC additionally has a web interface which enables it to communicate with remote devices such as remote personal computer device 110 as illustrated by the dotted line 111 in FIG. 1. The web interface permits any suitably authorised remote user (or automated application) to send queries to the FCC and to receive responses to those queries, for example via a web browser which displays the data returned by the FCC to the user.

Figure 2:
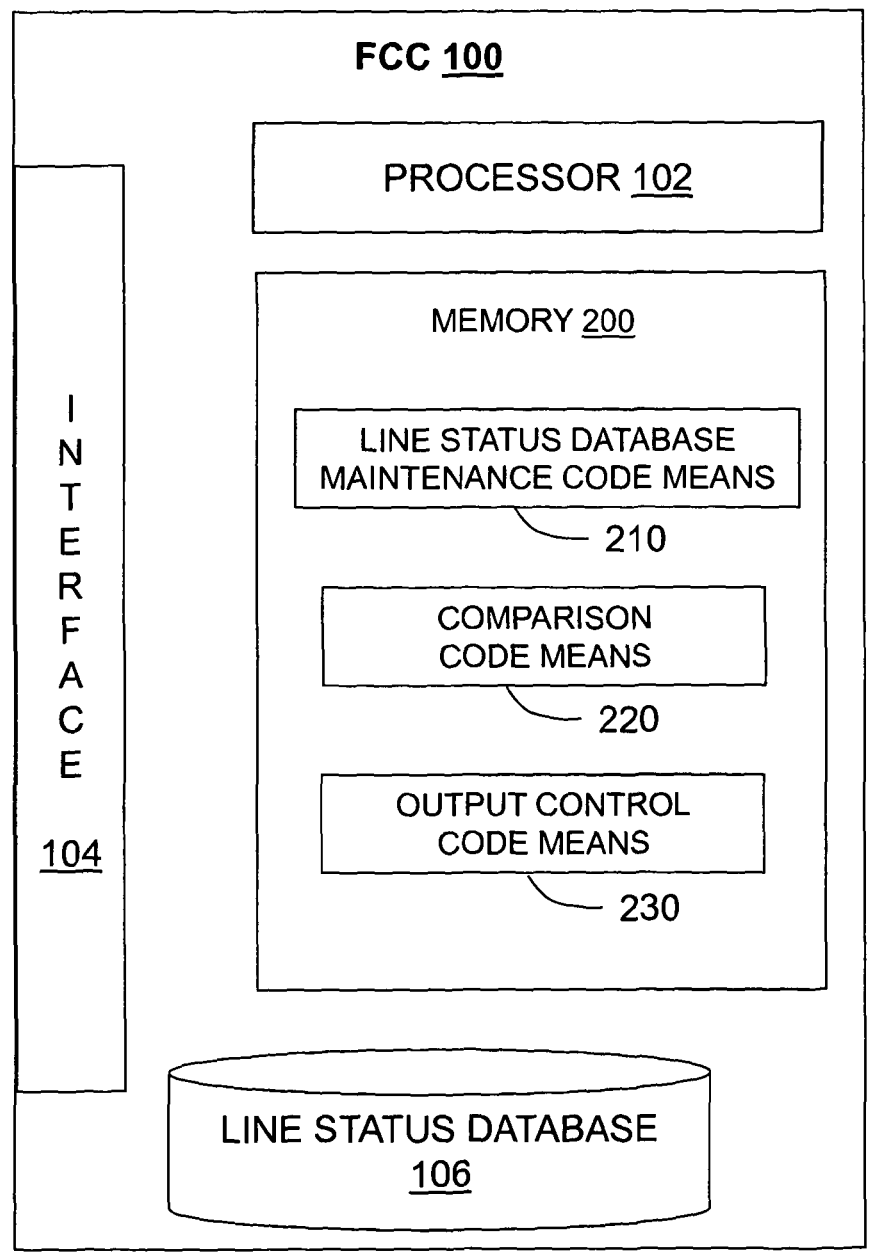
FIG. 2 is a schematic block diagram illustrating the File Check Console module of FIG. 1 in greater detail.

Referring now to FIG. 2, the structure and operation of the FCC 100 is described below in greater detail. Structurally, the FCC 100 can be considered as comprising a processor subsystem 102, an Interface 104, a Line Status Database 106 and a memory 200 in which is stored the various programs required to run the FCC 100. In addition to the normal programs required to run a server computer in general (e.g. operating system, web server standard functionality, interface software, etc.) the memory 200 additionally contains Line Status Database Code Means 210, Comparison Code Means 220 and Output Control Code means 230.

The Line Status Database Code Means 210 controls the way in which the database 106 is updated in response to the receipt of data, whether it be from the DLM 80, the OSS provisioning/de-provisioning system 90, or indeed from an authorised user operating remote pc 110 via the web interface. In the present embodiment, all three interfaces to these three different systems are considered to go via the same physical interface 104 to the management network 60 (though of course separate physical interfaces could be used in alternative embodiments etc.). The Comparison Code Means 220 controls the way in which newly received data is compared with the expected data (as stored in the database 106) in order to ascertain if the database needs updating and if any action should be taken as a result of there being apparently missing data based on the comparison between received data and expected data, etc. These processes are described in greater detail below with reference to FIG. 3. Finally, the output control code means is responsible for taking any actions which need to be taken as a result of, for example, the comparison means identifying that some expected data is missing. For example, it may control the initiation of a request for missing data to be resent, or it may cause a message to be sent to a remote user via the web interface or for the response to any user requests for data to be highlighted in such a manner as to make the missing data appear more conspicuous, etc.

Figure 3:
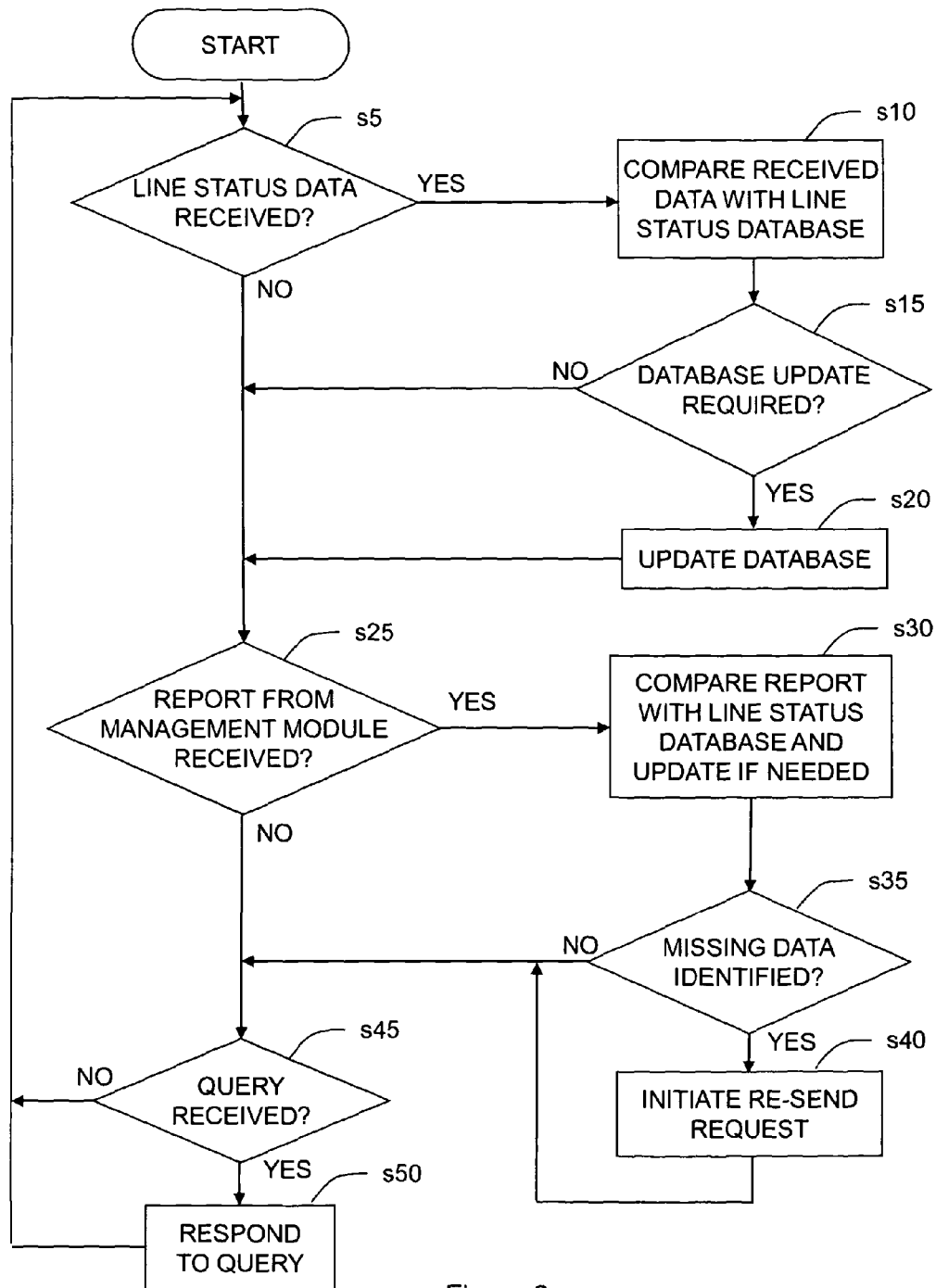
FIG. 3 is a flow chart illustrating the steps performed by the File Check Console module of FIGS. 1 and 2 in an embodiment of the present invention.

Referring now to FIG. 3, the steps performed by the FCC 100 under the control of the various code means 210, 220 and 230 are now described. FIG. 3 presents the method as though it were performed sequentially. However, this is merely done for ease of description. It will be apparent that modern programming techniques tend to operate in a multi-threaded manner and often in a message based approach—(e.g. messages are received and then processed and the results of the processing returned to the element which initiated the message, etc.)—and the present embodiment uses these standard techniques in order to implement the functionality illustrated in FIG. 3.

When the process commences at step s5 the FCC determines if it has received any line status data from the line provisioning/de-provisioning system 90 (this is in the present embodiment an inventory management system and it is able to provide initially a full data set of all of the lines in the access network which are to be managed by the DLM 80 and the FCC 100, and thereafter it provides to the FCC via communication line 901, details of any provisions, ceases or modifications (e.g. resulting from orders for such actions being fed into the OSS system)). If it has, the process moves to step s10 where the received data is compared with the data currently contained within the database 106 to see if an update to the database is required.

In the present embodiment, the data which is reported by the OSS device 90 and (which is maintained in the database 160 in respect of each line) includes:
  an identification for each circuit (i.e. for each telecommunications line) (e.g. a 16 character alpha numeric code);
  the number of bins of data collected by the DSLAM in respect of the connection (the operation/performance data collated by the DSLAM is often provided as a set of sub-sets of data, each sub-set relating to a particular time period—often a 15 minute period, in which case a full 24 hour's worth of data should contain 96 bins, and so the number 96 would be stored for such a line—in older DSLAMs operation/performance data for a line may only be kept in respect of a single 24 hour period in which case the number of bins for that line would be 1, etc.);
  the type of CPE modem being used on the connection (if known—even if this is not known it will be known what protocol is being used for the DSL connection, e.g. basic ADSL, ADSL2, ADSL2+, etc.);
  the type and/or model and/or vendor of the DSLAM to which the circuit is connected;
  the ID of the DSLAM to which the circuit is connected (also an alphanumeric code, typically); and
  the ID of the DC which manages the DSLAM to which the circuit is connected The process then proceeds to step s15 where it is ascertained whether or not an update is required. If the information received is more recent than the information contained in the database, the database has not already been amended to reflect the new information and the new information is different to what is currently contained in the database, then it is determined that an update is required and the process moves to step s20, whereas if no update is required the process proceeds directly to step s25. At step s20 the database 106 is accordingly updated under the control of the database maintenance code means 210 to reflect the newly received information.

At step s25, the FCC determines whether or not it has received new information (e.g. a report) from the management module, DLM 80. If so, the method proceeds to step s30 in which the FCC 100, under the control of the comparison code means 220, analyses the report to see if an update to the database is required. In the present embodiment, the DLM 80 sends two types of report to the FCC. The first type of report is sent whenever it (DLM 80) receives a report from a DC. This first type of report contains a listing of which DSLAMs have been included in the report received from the DC and may comprise a list of Comma Seperated Values (CSV) pairs of data comprising the DC ID and the DSLAM ID. Thus if a report is received from DC 71 having, for example DC ID DC01 and it contains data received from DSLAMs 51 and 52 (having, for example IDs DSLAM01 and DSLAM02) the report from the DLM 80 to the FCC 100 might comprise a list as follows:

DC01,DSLAM01
DC01,DSLAM02

Since, in the present embodiment, each report from a DC is expected to be complete (i.e. to include data from all of the DSLAMs which it manages), from this report, the FCC can identify whether or not all of the DSLAMs which it expects to see in the report are included in the report or not. If some of the expected DSLAMs are not mentioned in the report which the FCC receives from the DLM 80 this will be identified in step s35. This first type of report is sent, in the present embodiment, each time the DLM 80 receives a report from the DC.

The other type of report which the DLM 80 sends to the FCC in the present embodiment is a much more detailed report which is only sent once per 24 hour period. In this much fuller report, as well as specifying all of the DC's which have sent a report in the relevant 24 hour period under consideration, the report includes a CSV file containing a line for each circuit for which data has been received by the DLM, specifying how many bins of data were collected in respect of that circuit for the relevant 24 hour period. From this report, the FCC can identify if any DC's have completely failed to send a report, in which case, in the present embodiment, a request, for a resend of data from that DC to the DLM 80, is sent by the FCC directly to the DC in question over the management network 60. Furthermore, it can identify which if any circuits are missing data either completely (i.e. the CSV file completely fails to identify the circuit in question) or partially (i.e. the circuit in question is identified in the CSV file as having less than the expected number of bins). In the present embodiment, this information is stored in a table in the database 106 and is viewable by an engineer over the web interface in response to a suitable request for data (e.g. a request might ask for information about all circuits containing no information at all over a particular period, or all circuits containing less than 100% of the expected number of bins over a certain period etc.).

In all cases, the FCC stores within its database all of the received information, in particular identifying in respect of each DC whether or not a report has been received in respect of each report period (normally 24 hours), and also in respect of each DSLAM (or MSAN or other aggregation device) for the given report period, and also in respect of each circuit (also for that report period) and finally also in respect of each bin for each circuit (for a particular report period). If after updating the tables in this way the FCC determines at step s35 that some of the expected data for a given report period, in respect of either an entire DC or an entire DSLAM has not been received, then, in the present embodiment, the process proceeds to step s40 in which a message is sent back to the DLM 80 informing it that a report from either a DC or a DSLAM is missing and the DLM then sends a message back to the respective DC asking it to (re)send the missing information. Upon completion of step s40 the method proceeds to step s45. If all of the expected DC's and all of the expected DSLAMs have reported in the relevant report period, then the method proceeds straight from s35 to step s45.

In step s45 the FCC determines whether or not it has received a query via the web interface (e.g. from pc 110). Whenever a query is received it is responded to a step s50 in an appropriate manner. For example, the requester may be authorised and if the authorisation process succeeds the correct response will be obtained and sent to the requestor over the web interface. Upon completion of step s50 the method returns to step s5 to await any further inputs to the FCC.

Variations

In the embodiment described above, the FCC only receives reports directly from the DLM. In alternative embodiments, however, the FCC could receive reports directly from DCs or even from DSLAMs. In such a case the data received may either by a direct copy of what is sent to the DLM (or to the DC in the case of DSLAMs or even MSANs, etc.) which has the advantage that it is less likely that there will be a discrepancy between what is actually sent to the DLM (or DC) and what the FCC is led to believe has been sent to the DLM (or DC), or alternatively, the DC (or DSLAM) could prepare a special report for the FCC which summarises the content which is actually sent to the DLM (or DC).

For the first type of reports which are sent whenever a report has been received by the DLM form a DC, instead of just specifying the IDs of the DSLAMs which have been included in the report, the report could further specify for each DSLAM which has been included in the report, the number of circuits for which data has been reported. The expected number of circuits for a particular DSLAM is obtainable from the database 106 and so this information can be used to flag up DSLAMs which appear to be missing data from their reports to the DC (although the problem could of course lie with the DC and not the DSLAM—thus a preferred approach for dealing with a situation where a DSLAM appears to have omitted data may be to contact the DC which sent the report and point out that less than the total number of circuits appears to have been accounted for and asking the DC to re-obtain the information form the DSLAM in case some data was missing).

In the above embodiment, re-send requests are automatically generated if the FCC determines that data from an entire DC or from an entire DSLAM/MSAN/aggregator device is missing, but not if data from a single circuit is missing. In alternative embodiments different approaches could be adopted, for example requests could be generated automatically even in respect of data missing from just a single circuit.

Alternatively, no such requests could be automatically generated even if data is detected as being missing from an entire DC or DSLAM/aggregator device, etc. and instead the system could rely simply on an engineer examining the database and seeing that the data is missing from an entire DC, etc. In addition, the FCC could take further actions in response to detecting that data is missing. For example it could report that data is missing in respect of a particular circuit to the DLM so that the DLM can alter it's profile setting behaviour to more cautiously interpret the data which it does have if data is missing, to avoid taking drastic action that might not be justified (even though it would perhaps have been justified if it was based on the same data were there no missing data)— for example, if a circuit has only had 10 out of 96 bins reported and there were no errors or reconnections reported in those bins, this might have been taken as evidence that the line could be moved onto a more aggressive profile. However this might be unjustified since there may have been errors and or resynchs occuring in the periods of time covered by the missing bins—similarly, if those same 10 bins contained evidence of several (e.g. 10) errors and/or resynchs occuring, a DLM process which calculated errors and/or resynchs per unit time might conclude that the meantime between errors and/or resynchs for the entire period was 15 mins, whereas it is possible that there were no further errors or resynchs in the other (missing) 86 bins and had that been known the mean time between errors and/or resynchs would have been about 144 minutes. The former mean time might have caused the DLM to move the line onto a less aggressive profile which it perhaps should not be doing given that information is missing.

The invention claimed is:

1. A telecommunications access network including:
   a plurality of telecommunications lines,
   a plurality of aggregation devices,
   a plurality of data collector modules and
   a line provisioning and de-provisioning system,
   wherein each line is connected between customer premises equipment and a line aggregation device,
   the access network being operable to provide a data connection through at least one of the lines to a core network whereby network services may be provided over the network to the customer premises equipment,
   the access network further including a management module for managing the lines within the access network, the management module being operable to receive aggregated performance data from a plurality of data collector modules,
   each data collector module being operable to receive performance data from a plurality of the line aggregation devices,
   the network further comprising a file check module, the file check module having a line status database for storing information about the lines which are managed by the management module including the identity of the line aggregation device to which each line is connected and means for receiving information from the line provisioning and de-provisioning system and means for using the information received from the line-provisioning and de-provisioning system to maintain the file check module's database current;
   the file check module further comprising receiving means for receiving received data information from the management module specifying what performance data it has received and comparison means for comparing the received data information with data from the database to generate comparison data, and output means for outputting the generated comparison data.

2. A telecommunications access network according to claim 1 wherein the comparison data identifies missing performance data which has not been successfully received by the management module.

3. A telecommunications access network according to claim 2 wherein the line status database stores information identifying whether or not performance data about a particular line is to be expected or not.

4. A telecommunications access network according to claim 3,
   wherein the line status database includes information specifying which aggregator devices are managed by which data collector modules, and
   wherein the management module is operable, each time the management module receives a file of data from a data collector, to determine the identities of aggregator devices whose data is contained within the received file and to send these identities together with the identity of the respective data collector to the file check module, and
   wherein the file check module is further operable to check that all of the expected aggregator devices have been included in the file received by the management module.

5. A file check module for use within the network according to claim 1 comprising:
   a line status database for storing information about the lines which are managed by the management module including the identity of the line aggregation device to which each line is connected and means for receiving information from the line provisioning and de-provisioning system and means for using the information received from the line-provisioning and de-provisioning system to maintain the file check module's database current,
   the file check module further comprising means for receiving received data information from the management module specifying what data it has received and means for comparing the received data information with data from the database to generate comparison data, and output means for outputting the generated comparison data.

6. A method of gathering line performance data about telecommunications lines within a telecommunications access network, the telecommunications access network including a plurality of telecommunications lines, a plurality of aggregation devices, a plurality of data collector modules and a line provisioning and de-provisioning system, wherein each line is connected between customer premises equipment and a line aggregation device, the access network being operable to provide a data connection through at least one of the lines to a core network whereby network services may be provided over the network to the customer premises equipment, the access network further including a management module for managing the lines within the access network, and a file check module, the method comprising:
   a plurality of the data collector modules transmitting aggregated line performance data to the management module, each data collector module being operable to receive line performance data from a plurality of the line aggregation devices; and
   the method further comprising:
   the file check module maintaining a line status database storing information about the status of lines which are managed by the management module, the status information identifying whether or not data connection performance data is expected from a particular line or not, and
   receiving information from the line provisioning and de-provisioning system and using the information received from the line-provisioning and de-provisioning system to maintain the database current;
   the file check module further receiving received line data information from the management module specifying the lines and/or the aggregation devices and/or the data collector modules from which line performance data has been received by the management module, comparing the received line data information with data from the line status database to identify missing line performance data, and outputting the results of the comparison.

7. Non-transitory carrier medium carrying a computer program or programs for causing the method of claim 6 to be carried out during execution of the program or programs.

8. The method as in claim 6, wherein the identified missing line performance data corresponds to data which has not been successfully received by the management module.

9. The method as in claim 8, wherein the line status database stores information identifying whether or not performance data about a particular line is to be expected or not.

10. The method as in claim 9, wherein the line status database includes information specifying which aggregator devices are managed by which data collector modules and wherein the management module determines, each time the management module receives a file of data from a data collector, the identities of aggregator devices whose data is contained within the received file and sends these identities together with the identity of the respective data collector to the file check module, and wherein the file check module checks that all of the expected aggregator devices have been included in the file received by the management module.

11. The method as in claim 6, wherein:

the access network provides the data connections through a first partial sub-set of the lines to the core network;

the management module manages at least a second partial sub-set of the lines within the access network; and wherein the first partial sub-set of the lines is different from the second partial sub-set of the lines.

12. The telecommunications access network according to claim 1, wherein:

the access network is configured to provide the data connections through a first partial sub-set of the lines to the core network;

the management module is configured to manage at least a second partial sub-set of the lines within the access network; and the first partial sub-set of the lines is different from the second partial sub-set of the lines.

* * * * *